(12) United States Patent
Gillay

(10) Patent No.: US 9,266,491 B1
(45) Date of Patent: Feb. 23, 2016

(54) CURTAIN AIRBAG GUIDE BRACKET

(71) Applicant: Toyota Motor Engineering & Manufacturing North America, Inc., Erlanger, KY (US)

(72) Inventor: Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/587,600

(22) Filed: Dec. 31, 2014

(51) Int. Cl.
*B60R 21/16* (2006.01)
*B60R 21/213* (2011.01)
*B60R 21/217* (2011.01)
*B60R 21/262* (2011.01)

(52) U.S. Cl.
CPC ............. *B60R 21/213* (2013.01); *B60R 21/217* (2013.01); *B60R 21/262* (2013.01)

(58) Field of Classification Search
USPC .................................. 280/728.2, 728.3, 730.2
See application file for complete search history.

(56) References Cited

U.S. PATENT DOCUMENTS

| | | | | |
|---|---|---|---|---|
| 6,079,732 A | * | 6/2000 | Nakajima et al. | 280/728.2 |
| 6,082,761 A | * | 7/2000 | Kato et al. | 280/730.2 |
| 6,142,506 A | * | 11/2000 | Patel et al. | 280/728.2 |
| 6,149,185 A | * | 11/2000 | White et al. | 280/728.2 |
| 6,254,123 B1 | * | 7/2001 | Urushi et al. | 280/730.2 |
| 6,530,594 B1 | * | 3/2003 | Nakajima et al. | 280/730.2 |
| 6,736,421 B2 | * | 5/2004 | Blake et al. | 280/730.2 |
| 6,974,151 B2 | * | 12/2005 | Ochiai et al. | 280/728.2 |
| 7,607,684 B2 | * | 10/2009 | Downey et al. | 280/730.2 |
| 7,934,748 B2 | | 5/2011 | Torii | |
| 7,963,551 B2 | * | 6/2011 | Matsuoka et al. | 280/730.2 |
| 8,702,124 B2 | | 4/2014 | Williams et al. | |
| 2007/0164544 A1 | | 7/2007 | Fulmer et al. | |
| 2014/0110922 A1 | | 4/2014 | Uchida | |

FOREIGN PATENT DOCUMENTS

JP  2014015087 A  1/2014

* cited by examiner

*Primary Examiner* — Toan To
(74) *Attorney, Agent, or Firm* — Christopher G. Darrow; Darrow Mustafa PC

(57) ABSTRACT

A curtain airbag guide bracket includes an airbag guide configured to direct deployment of an airbag toward an interior of a vehicle. The airbag guide includes an inside surface positioned adjacent the airbag and an opposite outside surface positioned adjacent a vehicle panel. A connector is used to attach the airbag guide to the vehicle panel. The airbag guide bracket also includes a post located adjacent the outside surface of the airbag guide. The post has a first side and a second side. The second side of the post is positioned closer to the connector than the first side of the post. The post is disposed within an aperture formed in the vehicle panel, such that the first side of the post engages an edge of the aperture and the second side of the post is displaced away from the edge of the aperture.

18 Claims, 4 Drawing Sheets

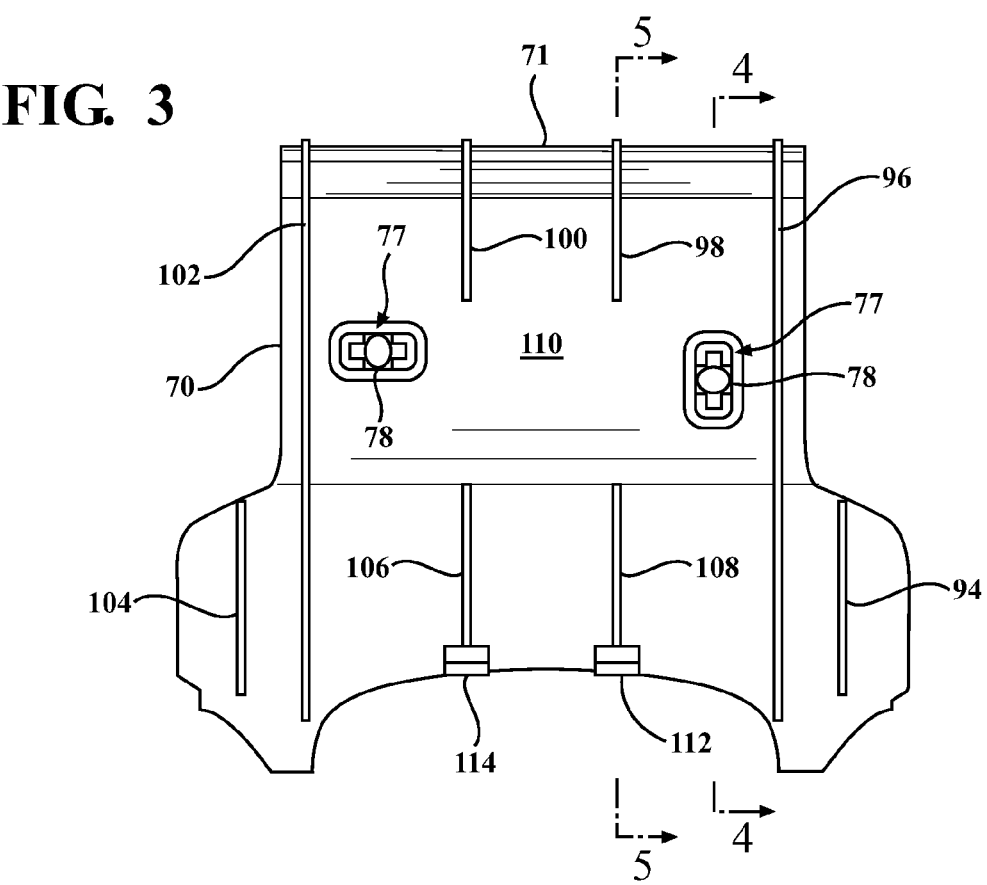
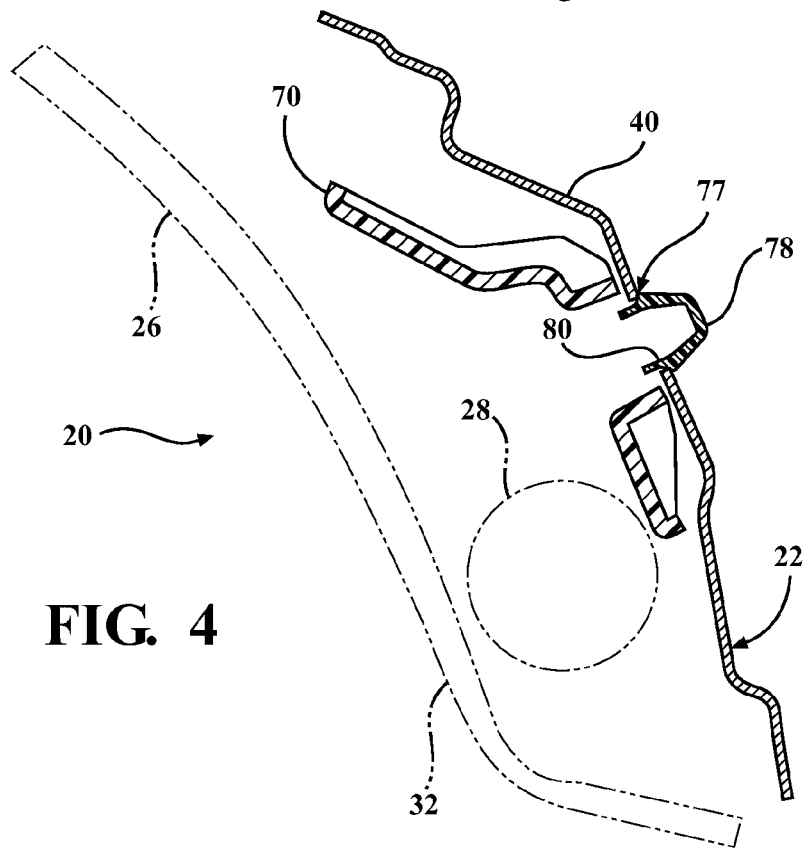

CURTAIN AIRBAG GUIDE BRACKET

BACKGROUND

A curtain airbag system provides protection for vehicle occupants in a collision. The airbag system includes a curtain side airbag that may be positioned at various locations within a passenger compartment of a vehicle. For example, the curtain side airbag may be located in a headliner of the vehicle to protect a head of the occupant during an accident. When deployed, the curtain side airbag displaces a portion of the headliner, or a trim panel, and expands into the passenger compartment of the vehicle to protect the passenger from injury.

A typical curtain airbag device may include an inflatable airbag and an inflator that inflates and deploys the airbag. The airbag may initially be folded in a compact elongated shape. The inflator supplies gas to the airbag at the time of a collision to deploy the airbag. The inflator may be fixed to a position along the roof side rail. The airbag may also be fixed to the roof side rail at predetermined intervals. An airbag guide bracket may be positioned between the airbag and a body of the vehicle. The airbag guide bracket guides the airbag inward toward the passenger compartment of the vehicle as the airbag is being deployed. The airbag guide bracket serves to guide the airbag during inflation and prevent a pillar garnish and/or a pillar inner panel from interfering with deployment of the airbag.

The airbag guide bracket may be configured to minimize deformation of the bracket when subjected to forces generated by a deploying airbag. During minor collisions the airbag inflator may not be activated, and it may be possible for a head of an occupant to collide with the interior trim covering the airbag guide bracket. Under such conditions it is desirable that the airbag guide bracket be capable of deflecting to help cushion the impact load caused by a passenger impacting the airbag guide bracket.

SUMMARY

Disclosed is a curtain airbag guide bracket configured to restrict pivoting and lateral movement of the bracket when deploying an airbag during a collision, while enabling limited deflection of the bracket in a direction generally perpendicular to the direction of lateral movement. The airbag guide bracket may include a generally U-shaped airbag guide positioned between an airbag and a vehicle panel. A pair of connectors is used to attach the airbag guide bracket to the vehicle panel. The airbag guide bracket includes at least one post extending from a rear of the airbag guide bracket. The post has a first side and a second side. The second side of the post is positioned closer to the connector than the first side of the post. The post is disposed within an aperture formed in the vehicle panel, such that the first side of the post engages an edge of the aperture and the second side of the post is displaced away from the edge of the aperture.

BRIEF DESCRIPTION OF THE DRAWINGS

The various features, advantages and other uses of the present apparatus will become more apparent by referring to the following detailed description and drawings, in which:

FIG. 3 is a schematic rear plan view of the airbag guide bracket;

FIG. 4 is a schematic cross-sectional view of the airbag guide bracket taken along section line 4-4 of FIG. 3;

DETAILED DESCRIPTION

Figure 1:
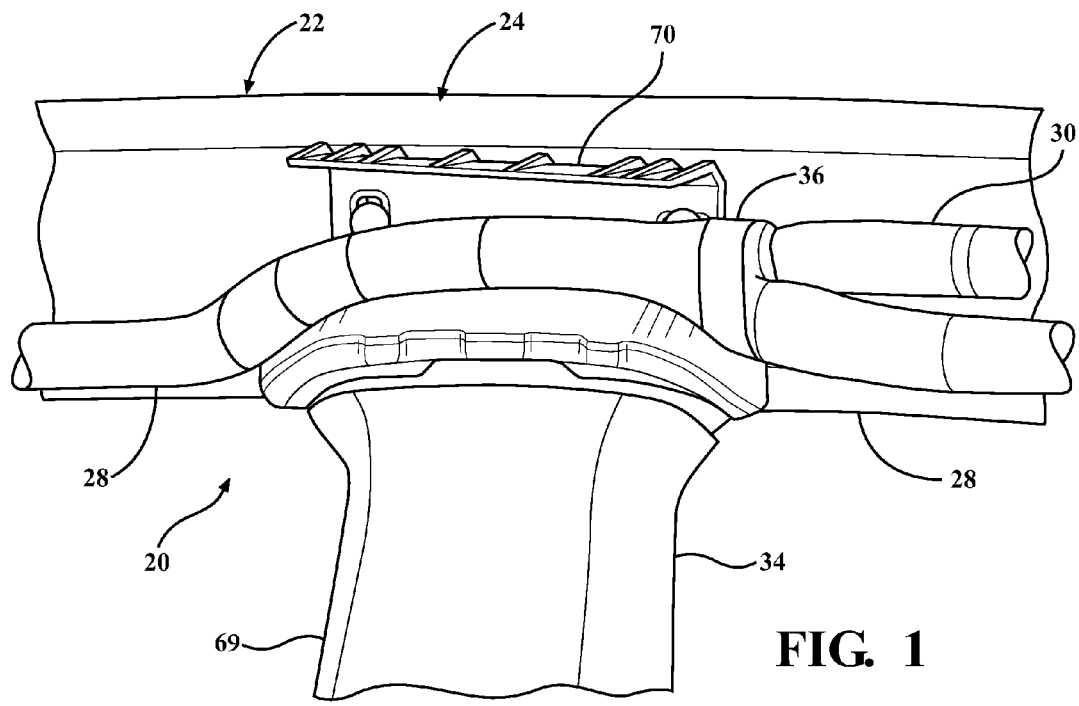
FIG. 1 is a schematic illustration of an exemplary curtain airbag system mounted to a vehicle roof side rail.
Figure 2:
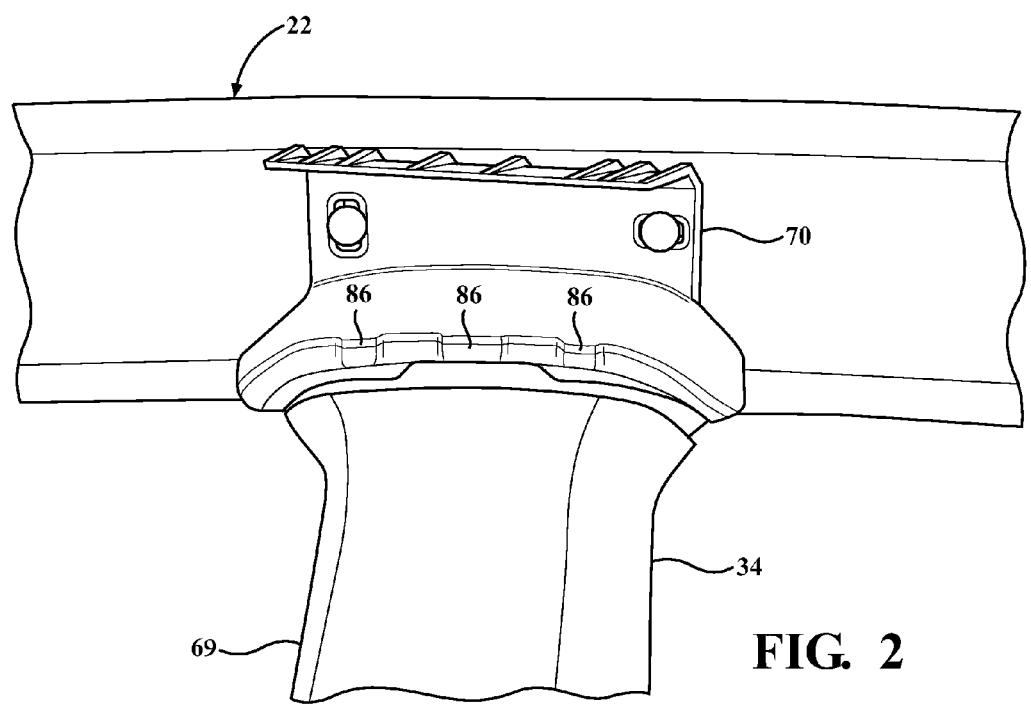
FIG. 2 is a schematic illustration of an exemplary airbag guide bracket employed with the curtain airbag system of FIG. 1.

Disclosed is an airbag guide bracket configured for controlling a direction in which an airbag is deployed. The airbag guide bracket includes features that restrict lateral and pivoting movement of the airbag guide bracket that may occur when the airbag is deployed during a collision. The airbag guide bracket is also capable of being deflected in a direction generally perpendicular to the direction of lateral movement to at least partially absorb an impact force applied to the airbag guide bracket that may occur, for example, during a low impact collision insufficient to activate the airbag.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, an exemplary curtain airbag system 20 is illustrated mounted to a roof side rail 22 of a vehicle 24. The curtain airbag system 20 may be concealed under a roof headliner 26, as illustrated, for example, in FIG. 5, or another vehicle interior trim piece. The roof headliner 26 is not shown in FIG. 1 to illustrate various features of the underlying curtain airbag system 20.

Figure 5:
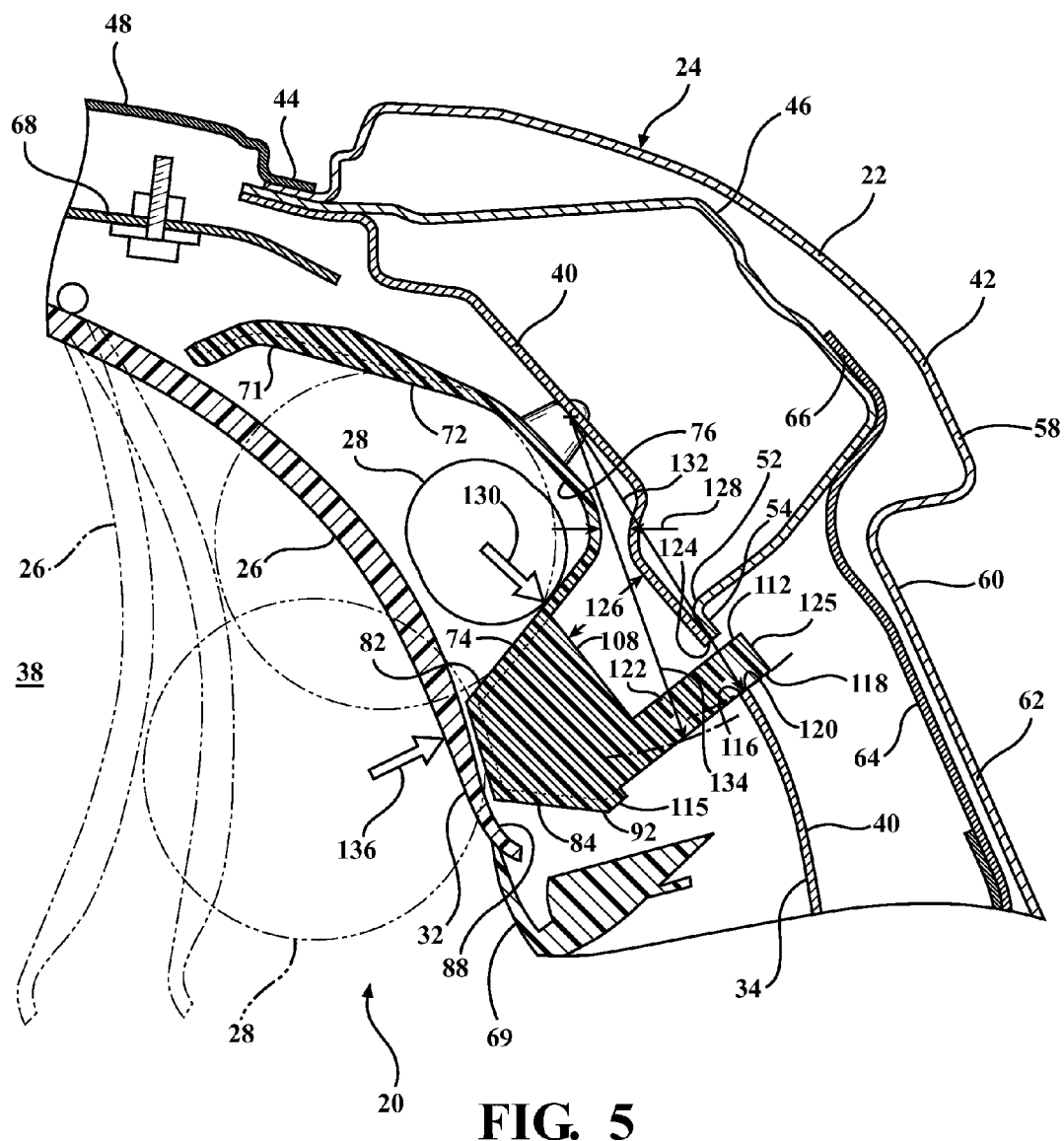
FIG. 5 is a schematic cross-sectional view of the airbag guide bracket attached to the vehicle roof side rail taken along section line 5-5 of FIG. 3.

With reference to FIGS. 1 and 5, the curtain airbag system 20 may include a curtain airbag 28 mounted to the roof side rail 22. An inflator 30 (gas generator) supplies a gas to the curtain airbag 28 for inflating and deploying the airbag during a collision. The curtain airbag 28 may be stored in folded state between the roof side rail 22 and the roof headliner 26 near a terminal end portion 32 of the roof headliner 26. The curtain airbag 28 may extend lengthwise along the roof side rail 22 and straddle a pillar 34.

The inflator 30 may have a generally cylindrical shape. The inflator 30 may be positioned between the roof side rail 22 and the roof headliner 26 with its longitudinal axis orientated lengthwise relative the roof side rail 22 in a generally forward/rearward direction of the vehicle 24. The inflator 30 may be fixed to the roof side rail 22 by way of a bracket or another suitable connecting mechanism.

A generally cylindrical-shaped gas supply passage 36 connects the inflator 30 to the curtain airbag 28. Activating the inflator 30 during a collision causes gas from the inflator 30 to be delivered to the curtain airbag 28 through the gas supply passage 36.

An air bag ECU (not shown) for controlling operation of the inflator 30 may be mounted to the vehicle 24 and electrically connected to the inflator 30. One or more collision detecting sensors and/or rollover sensors (not shown) mounted to the vehicle 24 may also be electrically connected to the air bag ECU. When a side collision or vehicle rollover is detected by the collision detecting sensors and/or rollover sensors, the air bag ECU actives the inflator 30 to produce the gas to inflate the curtain airbag 28. Gas generated by the inflator 30 travels through the gas supply passage 36 to the curtain airbag 28. The gas causes the curtain airbag 28 to inflate. Pressure from the expanding curtain airbag 28 forces the terminal end portion 32 of the roof headliner 26 inward toward a passenger compartment 38 of the vehicle 24. The expanding curtain airbag 28 pushes open the terminal end portion 32 of the roof headliner 26. Displacement of the terminal end portion 32 of the roof headliner 26 in response to the expanding curtain airbag 28 is illustrated schematically in FIG. 5.

The roof side rail 22 may include various configurations. For example, with reference to FIG. 5, the roof side rail 22 may include a pillar inner panel 40 connected to an outer body panel 42 at a panel connection joint 44. A roof rail reinforcement panel 46 positioned between the pillar inner panel 40 and the outer body panel 42 may be joined to the pillar inner panel 40 and the outer body panel 42 at the panel connection joint 44. A roof panel 48 may be joined to the pillar inner panel 40, the outer body panel 42 and the roof rail reinforcement panel 46 at the panel connection joint 44. The pillar inner panel 40 may be joined to an end 52 of the roof rail reinforcement panel 46 at a connection joint 54.

A lower end portion 58 of the outer body panel 42 may be integrally formed with an upper end 60 of a pillar outer panel 62. A pillar reinforcement panel 64 may be joined to the roof rail reinforcement panel 46 at junction 66. A center roof cross member 68 extends between the right and left roof side rails 22.

With continued reference to FIGS. 1 and 5, the roof side rail 22 may be covered by the terminal end portion 32 of the roof headliner 26, as shown, for example, in FIG. 5. The pillar inner panel 40 may be covered from the passenger compartment 38 side with a pillar garnish 69. The pillar garnish 69 may be attached to the pillar inner panel 40 using any of a variety of connectors.

With reference to FIGS. 2-5, the curtain airbag system may include an airbag guide bracket 70 positioned between the curtain airbag 28 and the roof side rail 22. The airbag guide bracket 70 may have a generally rectangular shape when viewed from the perspective of FIG. 3. The airbag guide bracket 70 may include a generally U-shaped airbag guide 71 forming a convex cavity when viewed from the passenger compartment 38. The airbag guide 71 operates to guide the curtain airbag 28 inward toward the passenger compartment 38 of the vehicle 24 as the curtain airbag 28 is being deployed. The airbag guide 71 helps reduce the potential for the pillar garnish 69 and pillar inner panel 40 to interfere with deployment of the curtain airbag 28. The airbag guide 71 may include an upper guide wall 72 and a lower guide wall 74 that extend alongside the curtain airbag 28. A coupling wall 76 interconnects the upper and lower guide walls 72 and 74.

With reference to FIGS. 3 and 4, the airbag guide bracket 70 may be formed from any of a variety of materials, including but not limited to, plastics, composites, and metallic materials. The airbag guide bracket 70 may be attached to the roof side rail 22 at a connecting joint 77 using one or more connectors 78. In the exemplary configuration, two spaced apart connectors 78 are used to attach the airbag guide bracket 70 to the roof side rail 22, but fewer or more connectors may also be used. The connectors 78 may be integrally formed with the airbag guide bracket 70, or may be a separate component. The connectors 78 may be arranged at opposite ends of the airbag guide bracket 70. The connectors 78 engage a corresponding aperture 80 formed in the roof side rail 22 to secure the airbag guide bracket 70 to the roof side rail 22.

With particular reference to FIG. 5, the lower guide wall 72 of the airbag guide 71 may be oriented in a generally downward sloping angle when viewed from the perspective of FIG. 5. The lower guide wall 74 may be positioned to extend below the curtain airbag 28. A lower end 82 of the lower guide wall 74 may be located adjacent the terminal end portion 32 of the roof headliner 26. A support member 84 may extend from the lower end 82 of the lower guide wall 72. The support member 84 may be located adjacent the terminal end portion 32 of the roof headliner 26 and may include one or more raised regions 86 (see for example, FIG. 2) that protrude generally inward toward the passenger compartment 38. The illustrated exemplary configuration includes three raised regions 86, but fewer or more raised regions 86 may also be employed. Each raised region 86 may abut a rear surface 88 of the terminal end portion 32 of the roof headliner 26. A lower end 90 of the support member 84 may include a region 92 that slopes away from the rear surface 88 of the roof headliner 26.

With reference to FIG. 3, the airbag guide bracket 70 may include multiple ribs, for example, ribs 94, 96, 98, 100, 102, 104, 106 and 108, extending from a rear surface 110 of the airbag guide 71. The ribs 94, 96, 98, 100, 102, 104, 106 and 108, provide support for the airbag guide 71 and improve flexural rigidity to reduce deformation of the airbag guide 71 that may occur when deploying the curtain airbag 28. The ribs 94, 96, 98, 100, 102, 104, 106 and 108, may be integrally formed with the airbag guide 71.

With reference to FIGS. 3 and 5, the airbag guide bracket 70 may include a pair of posts 112 and 114 extending from the support member 84 of the airbag guide bracket 70. Each post 112 and 114 engages a corresponding aperture formed in the pillar inner panel 40. For example, post 112 may engage aperture 116 formed in the pillar inner panel 40, as illustrated in FIG. 5. Post 114 may similarly engage a second aperture formed in pillar inner panel 40. The second aperture is spaced from aperture 116.

Post 112 and post 114 may be similarly configured. Accordingly, for the purpose of expediency, only the configuration and operation of post 112 and aperture 116 will be subsequently described, with the understanding that the post 114 and the corresponding aperture in pillar inner panel 40 may be similarly configured and operate in a similar manner as post 112 and aperture 116. With continued reference to FIG. 5, the post 112 may extend from the support member 84 in a direction generally away from the passenger compartment 38 and toward the pillar inner panel 40. The post 112 may be positioned proximate an end 115 of the support member 84, or alternatively, may be positioned in closer proximity to the lower guide wall 74. The rib 108 may connect the post 112 to the lower guide wall 74 of the airbag guide 71. The rib 108 may also be connected to support member 84. Post 114 may be similarly connected to the lower guide wall 74 of the airbag guide 71 by a rib 106, as illustrated for example in FIG. 3.

The post 112 may have a generally rectangular cross-sectional shape, as illustrated, for example, in FIG. 3, or may have another geometric shape. The post 112 extends through the aperture 116 in pillar inner panel 40 when the airbag guide bracket 70 is attached to roof side rail 22 using connectors 78. An outside surface 118 of the post 112 located furthest from the connecting joint 77 engages a circumferential edge 120 of the aperture 116 in the pillar inner panel 40. An opposite inside surface 122 is displaced from the circumferential edge 120, resulting in a clearance gap 124 between the post 112 and the circumferential edge 120 of the aperture 116.

The rib 108 does not extend the entire length of the post 112, but rather, is spaced from an end 125 of the post 112, such that a distance 126 between the pillar inner panel 40 and the rib 108 is greater than a minimum clearance 128 between the airbag guide bracket 70 and the roof side rail 22 over a region extending from the connecting joint 77 to the post 112. The clearance between the pillar inner panel 40 and the rib 108 is intended to prevent the rib 108 from interfering with movement of the airbag guide bracket 70 in a direction generally parallel to a longitudinal axis of the post 112.

The outside surface 118 of the post 112 has a generally smooth surface substantially free of surface features that could hinder axial movement of the post 112 within the aperture 116. For example, outside surface 118 does not include any steps, ribs, pins, or other surface features that could catch on pillar inner panel 40 as post 112 is moved axially within the aperture 116. The generally smooth section of the outside surface 118 extends from the end 125 of the post 112 to a distance not less than the distance between the end 125 and the rib 108.

With continued reference to FIG. 5, the post 112 interacts with the aperture 116 in pillar inner panel 40 to restrict pivoting movement of the airbag guide bracket 70 about the connecting joint 77 between the airbag guide bracket 70 and the roof side rail 22, as well as lateral movement in a direction generally perpendicular to the post 112. The pivoting and lateral movement of the airbag guide bracket 70 may occur as the result of forces exerted on the airbag guide bracket by the curtain airbag 28 as the airbag inflates. The orientation of the post 112 relative to the aperture 116 in the pillar inner panel 40 enables the airbag guide bracket to deflect in a direction generally parallel to the longitudinal axis of the post 112.

For example, inflating the curtain airbag 28 causes the airbag to impact the lower guide wall 74. A force 130 exerted on the lower guide wall 74 by the expanding curtain airbag 28 may cause the airbag guide bracket 70 to deflect laterally in a direction generally parallel to direction of the applied force 130. The force 130 may also cause the airbag bracket 70 to pivot counter-clockwise (as viewed from the perspective of FIG. 5) about the connecting joint 77 between the airbag guide bracket 70 and the roof side rail 22. If the resulting displacement were large enough, it could potentially result in the pillar garnish 68 interfering with deployment of the curtain airbag 28. Engaging the outside surface 118 of the post 112 with the circumferential edge 120 of the aperture 116 operates to restrict the lateral movement of airbag guide bracket in a direction generally perpendicular to the longitudinal axis of the post 112. Further, the angular orientation of the post 112 relative to connection joint 77 creates interference between the post 112 and the circumferential edge 120 of the aperture 116 that progressively increases as the airbag guide bracket 70 is pivoted counter-clockwise about the connection joint 77. This is due to a radial distance 132 from the connection joint 77 to the point at which the circumferential edge 120 of the aperture 116 engages the outside surface 118 of the post 112 being less than a radial distance 134 from the connection joint 77 to the portion of the outside surface 118 extending between the pillar inner panel toward the passenger compartment 38. Because the outside surface 118 of the post 112 is at a progressively greater distance from the connection joint 77 when moving from end 125 of the post 112 toward support member 84, pivoting the airbag guide bracket 70 counter-clockwise about the connecting joint 77 increases the interference between the post 112 and the circumferential edge 120 of the aperture 116, thereby effectively restricting counter-clockwise pivoting of the airbag guide bracket 70.

There may also be instances in which a collision is not severe enough (e.g., a low impact collision) to activate the inflator 30 and deploy the curtain airbag 28. It is possible, however, that a low impact collision may result in a head of a passenger (or another portion of the passenger's body) striking the roof headliner 26 in the vicinity of the terminal end portion 32. It is desirable under such circumstances to enable the airbag guide bracket 70 to deflect generally outward and away from the passenger compartment 38 to help cushion the impact.

The orientation of the post 112 relative to the aperture 116 in pillar inner panel 40 allows the airbag guide bracket 70 to deflect in a direction generally parallel to the longitudinal axis of the post 112 in response to an impact force 136 applied to the roof headliner 26 adjacent the support member 84 of the airbag guide bracket 70. Due to the generally smooth outside surface 118 engaging the circumferential edge 120 of the aperture 116, engagement of the post with the edge of the aperture 116 does not significantly restrict deflection of the airbag guide bracket 70 in response to the impact force 132, thereby enabling the airbag guide bracket 70 to absorb at a portion of the impact force 136.

Figure 6:
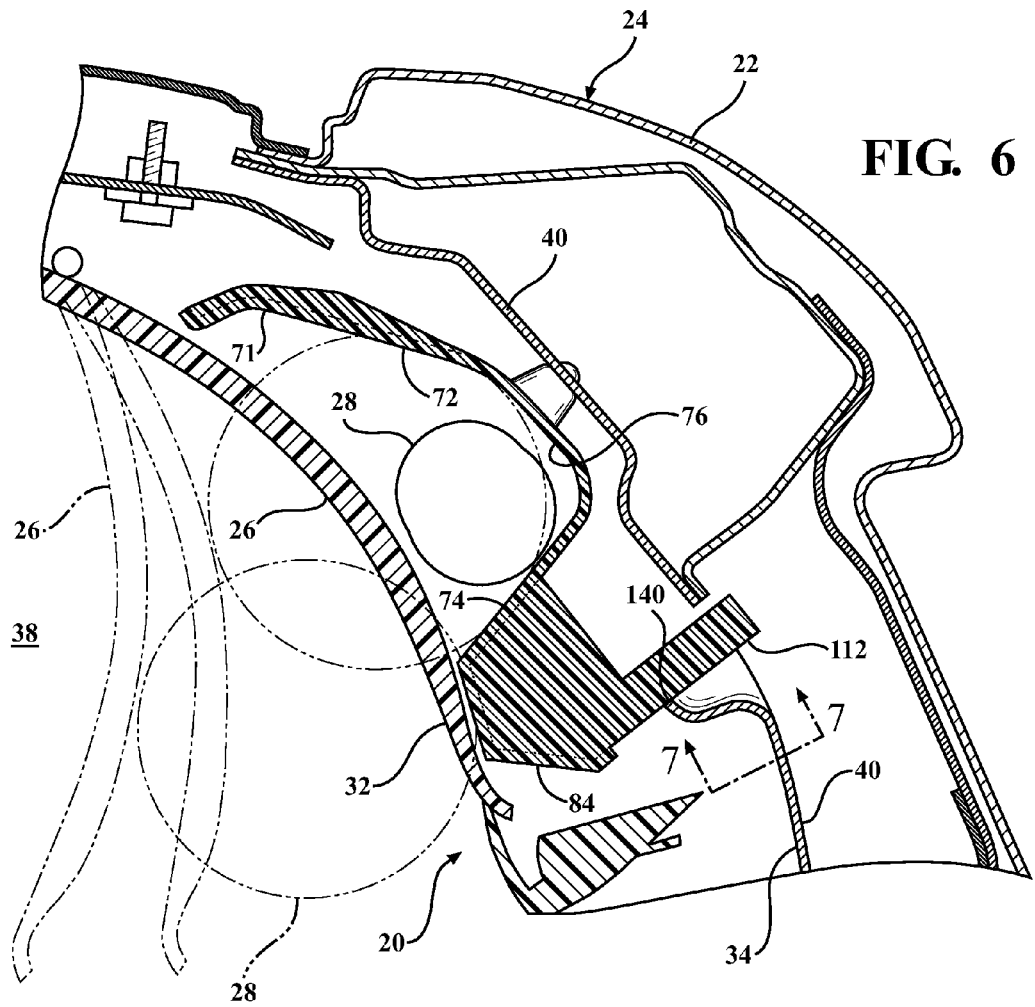
FIG. 6 is a schematic cross-section view of the airbag guide bracket employed with an alternately configured pillar inner panel.
Figure 7:
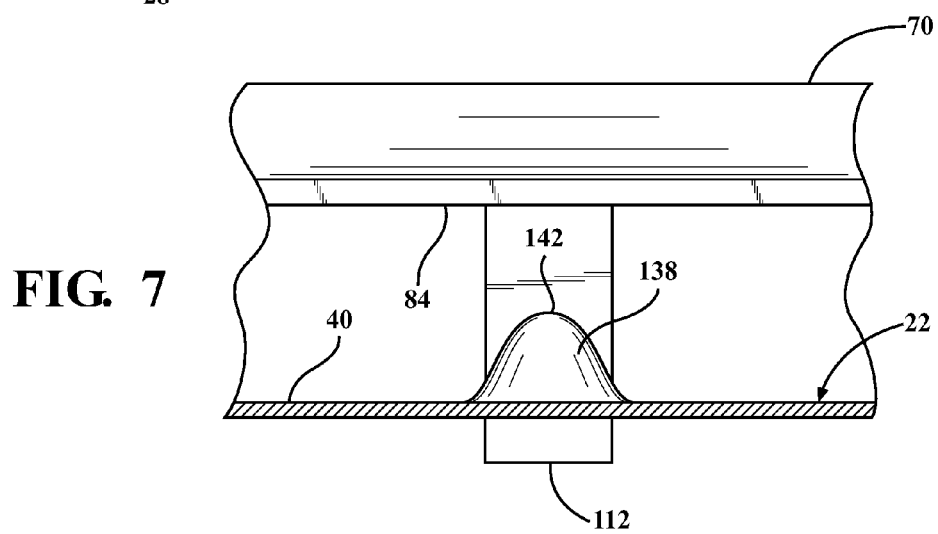
FIG. 7 is a schematic partial cross-sectional end view of the air guide bracket and alternately configured pillar inner panel of FIG. 6.

With reference to FIGS. 6 and 7, the pillar inner panel 40 may be alternately configured to move the contact point between the post 112 and the edge of the aperture 116 closer to the support member 84. This alternate configuration may increase resistance to pivoting of the airbag guide bracket 70 about the connecting joint 77, while continuing to enable the airbag guide bracket 70 to deflect in response to the impact force 136. The pillar inner panel 40 may include a dimpled or raised region 138 located adjacent post 112. The dimpled region 138 extends outward from the pillar inner panel 40 toward the support member 84. At least a portion of an edge 140 of the dimpled region 138 engages the post 117. The distance from the end 125 of the post 112 to a peak 142 of the dimpled region 138 is greater than a distance from the end 125 of the post 112 to the pillar inner panel 40 at location adjacent the inside surface 122 of the post 112.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. An airbag bracket system comprising:
   an airbag guide configured to direct deployment of an airbag toward an interior of a vehicle, the airbag guide including an inside surface positioned adjacent the airbag and an opposite outside surface configured to be positioned adjacent a vehicle panel;
   a connector attaching the airbag guide to the vehicle panel;
   a post located adjacent the outside surface of the airbag guide, the post including a first side and a second side, the second side positioned closer to the connector than the first side,
   the post configured to be at least partially disposed within an aperture defined in the vehicle panel, wherein the first side of the post engages an edge of the aperture and the second side of the post is displaced away from the edge of the aperture.

2. The airbag bracket system of claim 1 further comprising a rib interconnecting the airbag guide to the post.

3. The airbag bracket system of claim 2, wherein a distance between the vehicle panel adjacent the aperture and the rib is greater than a minimum clearance between the airbag guide and the vehicle panel over a region extending from the connector to the post.

4. The airbag bracket system of claim 1, wherein the inside surface of the airbag guide defines a generally concave shape and the outside surface defines a generally convex shape.

5. The airbag bracket system of claim 1 further comprising an airbag positioned adjacent the airbag guide, the airbag guide including a lower guide wall extending below the airbag, wherein the post is spaced a first distance from the connector and the lower guide wall is spaced a second distance, the first distance being greater than the second distance.

6. The airbag bracket system of claim 1, wherein a distance between an end of the post and the edge of the aperture adjacent the first side of the post is greater than a distance between the end of the post and the edge of the aperture adjacent the second side of the post.

7. The airbag bracket system of claim 1, wherein the airbag guide includes an inclined surface positioned between the airbag and the post.

8. The airbag bracket system of claim 1, wherein the vehicle panel includes a dimpled region extending toward an interior region of the vehicle, an edge of the dimpled region engaging the first side of the post.

9. The airbag bracket system of claim 1, wherein the post is oriented relative to the connector such that a distance from the connector to the edge of the aperture adjacent the first side of the post is less than a distance from the connector to the first side of the post along a region extending from a location adjacent the aperture toward a passenger compartment of the vehicle.

10. The airbag bracket system of claim 1, wherein the first surface of the post is substantially smooth.

11. An airbag system comprising:
    an airbag attached to a vehicle panel;
    an airbag guide positioned between the airbag and the vehicle panel;
    a connector attaching the airbag guide to the vehicle panel;
    a post extending from the airbag guide and including a first side and a second side, the second side positioned closer to the connector than the first side,
    the post configured to be at least partially disposed within an aperture formed in the vehicle panel such that the first side of the post engages an edge of the aperture.

12. The airbag system of claim 11, wherein the post is oriented relative to the connector such that a distance from the connector to the edge of the aperture adjacent the first side of the post is less than a distance from the connector to the first side of the post along a region extending from a location adjacent the aperture toward a passenger compartment of the vehicle.

13. The airbag system of claim 11, where the first surface of the post includes a substantially smooth surface over a region extending from a distal end of the post to a distance greater than a minimum clearance between the airbag guide and the vehicle panel over a region extending from the connector to the post.

14. The airbag system of claim 11 further comprising a rib interconnecting the airbag guide to the post.

15. The airbag system of claim 14, wherein a distance between the vehicle panel adjacent the aperture and the rib is greater than a minimum clearance between the airbag guide and the vehicle panel over a region extending from the connector to the post.

16. The airbag system of claim 11, wherein the vehicle panel includes a dimpled region extending toward an interior region of the vehicle, an edge of the dimpled region engaging the first side of the post.

17. The airbag system of claim 11, wherein a distance between an end of the post and the edge of the aperture adjacent the first side of the post is greater than a distance between the end of the post and the edge of the aperture adjacent the second side of the post.

18. The airbag system of claim 11, wherein the second side of the post is spaced from the edge of the aperture.

* * * * *